Patented Feb. 13, 1951

2,541,439

UNITED STATES PATENT OFFICE 2,541,439

OSMATE ESTERS OF 20-CYANOPREGNANES AND PROCESS

Lewis Hastings Sarett, Princeton, N. J., assignor to Merck & Co., Inc., Rahway, N. J., a corporation of New Jersey No Drawing. Application February 18, 1949, Serial No. 77,267

14 Claims. (Cl. 260—397.4)

This invention is concerned generally with novel steroid compounds and with processes for preparing them. More particularly it relates to 17,20-osmate esters of 17,20-dihydroxypregnane compounds which have a cyano substituent attached to the C-20 carbon atom, and to processes of preparing these compounds from the corresponding $\Delta^{17}$-20-cyano-pregnene compounds.

This application is a continuation-in-part of my copending application, Serial No. 778,465, filed October 7, 1947 which, in turn, is a continuation-in-part of my co-pending application Serial No. 773,525, filed September 11, 1947. I have disclosed in these parent applications that, when these novel 17,20-osmate esters of 17,20-dihydroxy-20-cyano-pregnane compounds are treated with a hydrolyzing agent, there is obtained the corresponding 17($\alpha$)-hydroxy-20-keto-pregnane compound. The 17-hydroxy group, introduced according to this novel method, is obtained, surprisingly enough, in only one isomeric form, namely the "$\alpha$" or "natural" configuration; i. e., the "$\alpha$" hydroxy groupings in the compounds thus obtained have the same stereo-chemical configuration as that present in many of the naturally-occurring adrenal hormones. This is of especial interest in the preparation of pregnene-4-diol-17-($\alpha$),21-trione-3,11,20 (commonly known as Kendall's Compound E) and its 21-acyl derivatives. These compounds are important as adrenal hormones or in therapy requiring adrenal hormone type compounds. They are further useful in the synthesis of similar hormones and compounds.

These 17,20-osmate esters of 17,20-dihydroxy-pregnane compounds which have a cyano substituent attached to the C-20 carbon atom possess an additional unexpected and valuable property; i. e., the osmate ester linkages in these compounds are, surprisingly enough, very stable to oxidizing agents. It is thus possible to react oxidizing agents with 17,20-osmate esters of 17,20-dihydroxy-20-cyano-pregnane compounds having one or more nuclear hydroxy substituents, thereby oxidizing the nuclear hydroxy substituents to keto radicals without affecting the osmate ester linkages. When the resulting nuclear keto-substituted 17,20-osmate-esters of 17,20-dihydroxy-20-cyano-pregnane compounds are hydrolyzed, there are obtained the corresponding 17($\alpha$)-hydroxy-20-keto-pregnane compounds containing at least one nuclear keto substituent. These compounds are of especial importance in preparing adrenal hormone type compounds, since such compounds ordinarily have one or more keto substituents attached to the perhydrophenanthrene nucleus.

The fact that the herein described 20-cyano-17,20-osmate esters are stable to oxidizing agents is indeed remarkable since, in 17,20-osmate esters of 17,20-dihydroxy-pregnane compounds which do not have a 20-cyano substituent, the osmate ester linkages are ordinarily extremely sensitive to oxidizing agents, such as chromic acid. For example, when the 17,20-osmate ester of 3($\alpha$), 17,20-trihydroxy-11-keto-pregnane is oxidized with chromic acid under conditions operative for the oxidation of the corresponding 20-cyano derivatives, none of the corresponding 17,20-osmate ester of 3,11-diketo-17,20-dihydroxy-pregnane is formed. When the 17,20-osmate of 3($\alpha$),17-20-trihydroxy-11-keto-20-cyano-pregnane is reacted with chromic acid the corresponding 17,20-osmate ester of 3,11-diketo-17,20-dihydroxy-20-cyano-pregnane is, however, obtained and with no appreciable loss in yield due to destructive oxidation of the 17,20-osmate grouping.

These novel and valuable 17,20-osmate esters of 17,20-dihydroxy-20-cyano-pregnane compounds are prepared by reacting osmium tetroxide with the corresponding $\Delta^{17}$-20-cyano-pregnene compound. Examples of these $\Delta^{17}$-20-cyano-pregnene starting materials are: $\Delta^{17}$-20-cyano-pregnene, $\Delta^{17}$-3($\alpha$)-acyloxy-20-cyano-pregnene, $\Delta^{17}$-3-acetoxy-20-cyano-pregnene, $\Delta^{17}$-3($\alpha$)-acyloxy-11-keto-20-cyano-pregnene, $\Delta^{17}$-3($\alpha$),21-diacyloxy-20-cyano-pregnene, $\Delta^{17}$-3($\alpha$),21-diacetoxy-20-cyano-pregnene, $\Delta^{17}$-3-acetoxy-11-keto-20-cyano-pregnene, $\Delta^{17}$-3-benzoxy-11-keto-20-cyano-pregnene, $\Delta^{17}$-3,12-diacyloxy-20-cyano-pregnene, $\Delta^{17}$-3,12,21-triacetoxy-20-cyano-pregnene, $\Delta^{17}$-3($\alpha$),21-diacyloxy-11-keto-20-cyano-pregnene, $\Delta^{17}$-3($\alpha$),21-diacetoxy-11-keto-20-cyano-pregnene, $\Delta^{17}$-3($\alpha$)-hydroxy-20-cyano-pregnene, $\Delta^{17}$-3($\alpha$)-hydroxy-11-keto-20-cyano-pregnene, $\Delta^{17}$-3($\alpha$) 21-dihydroxy-20-cyano-pregnene, $\Delta^{17}$-3-12-dihydroxy-20-cyano-pregnene, $\Delta^{17}$-3,12,21-trihydroxy-20-cyano-pregnene, $\Delta^{17}$-3($\alpha$),21-dihydroxy-11-keto-20-cyano-pregnene, $\Delta^{17}$-3-keto-20-cyano-pregnene, $\Delta^{17}$-3,11-diketo-20-cyano-pregnene, $\Delta^{17}$-3,12-diketo-20-cyano-pregnene, $\Delta^{17}$-3,11-diketo-20-cyano-21-acetoxy-pregnene, $\Delta^{17}$-3($\alpha$)-hydroxy-20-cyano-21-acetoxy-pregnene, $\Delta^{17}$,3-12-dihydroxy-20-cyano-21-acetoxy-pregnene, $\Delta^{17}$-3($\alpha$)-hydroxy-11-keto-20-cyano-21-acetoxy-pregnene, and the like. These starting materials can be prepared according to the procedures described in my co-pending applications Serial No. 778,465, filed October 7, 1947 and Serial No. 77,268, filed February 18, 1949.

The reaction between the $\Delta^{17}$-20-cyano-pregnene compound and osmium tetroxide is ordinarily carried out in the presence of pyridine and a solvent for the reactants, as for example, benzene. The reaction is conveniently conducted at room temperature under which condition the reaction is substantially complete in about 15 hours. The 17,20-osmate ester, produced according to this procedure can be recovered by evaporating the reaction solution to dryness, preferably under reduced pressure.

The 17,20-osmate esters of 17,20-dihydroxy-20-cyano-pregnane compounds produced according to this reaction include: the 17,20-osmate ester of 17,20-dihydroxy-20-cyano-pregnane, the 17,20-osmate ester of 3(a)-acyloxy-17,20-dihydroxy - 20 - cyano - pregnane, the 17,20 - osmate ester of 3(a) - acyloxy - 11 - keto - 17,20 - dihydroxy-20-cyano-pregnane, the 17,20-osmate ester of 3(a),21 - diacyloxy - 17,20 - dihydroxy - 20-cyano-pregnane, the 17,20-osmate ester of 3(a),21 - diacetoxy - 17,20 - dihydroxy - 20 - cyano-pregnane, the 17,20-osmate ester of 3-acetoxy - 11 - keto - 17,20 - dihydroxy - 20 - cyano-pregnane, the 17,20-osmate ester of 3-benzoxy - 11 - keto - 17,20 - dihydroxy - 20 - cyano-pregnane, the 17,20-osmate ester of 3,12-diacyloxy - 17,20 - dihydroxy - 20 - cyano - pregnane, the 17,20-osmate ester of 3,12,21-triacetoxy - 17,20 - dihydroxy - 20 - cyano - pregnane, the 17,20-osmate ester of 3(a),21-diacyloxy-11 - keto - 17,20 - dihydroxy - 20 - cyano - pregnane, the 17,20-osmate ester of 3(a),21-diacetoxy - 11 - keto - 17,20 - dihydroxy - 20 - cyano - pregnane, the 17,20 - osmate ester of 3(a),17,20 - trihydroxy - 20 - cyano - pregnane, the 17,20-osmate ester of 3(a),17,20-trihydroxy-11 - keto - 20 - cyano - pregnane, the 17,20-osmate ester of 3(a),17,20,21 - tetrahydroxy-20-cyano-pregnane, the 17,20-osmate ester of 3,12,17,20 - tetrahydroxy - 20 - cyano - pregnane, the 17,20-osmate ester of 3,12,17,20,21-pentahydroxy - 20 - cyano - pregnane, the 17,20 - osmate ester of 3(a),17,20,21 - tetrahydroxy - 11 - keto-20-cyano pregnane, the 17,20-osmate ester of 3 - keto - 17,20 - dihydroxy - 20 - cyano - pregnane, the 17,20-osmate ester of 3,11-diketo-17,20 - dihydroxy - 20 - cyano - pregnane, the 17,20 - osmate ester of 3,12 - diketo - 17,20 - dihydroxy - 20 - cyano - pregnane, the 17,20 - osmate ester of 3,11 - diketo - 17,20 - dihydroxy - 20 - cyano - 21 - acetoxy - pregnane, the 17,20 - osmate ester of 3(a),17,20 - trihydroxy - 20 - cyano - 21 - acetoxy - pregnane, the 17,20 - osmate ester of 3,12,17,20 - tetrahydroxy - 20 - cyano - 21 - acetoxy - pregnane, the 17,20 - osmate ester of 3(a),17,20 - trihydroxy - 11 - keto - 20 - cyano - 21 - acetoxy - pregnane, and the like.

Of particular interest are those 17,20-osmate esters of 17,20 - dihydroxy - 20 - cyano - pregnane compounds having at least one nuclear hydroxy substituent. In view of the stability to oxidizing agents possessed by the osmate ester linkages in these compounds, they can be oxidized to produce the corresponding 17,20-osmate ester of 17,20-dihydroxy - 20 - cyano - pregnane compounds in which the nuclear hydroxy substituents have been oxidized to keto radicals. For example, instead of preparing the 17,20-osmate ester of 3-keto - 17,20 - dihydroxy - 20 - cyano - pregnane by reacting osmium tetroxide with $\Delta^{17}$-3-keto-20-cyano-pregnene, this compound can be prepared by reacting the 17,20-osmate ester of 3,17,20-trihydroxy - 20 - cyano - pregnane with an oxidizing agent; similarly, the 17,20-osmate ester of 3,11-diketo - 17,20 - dihydroxy - 20 - cyano - pregnane is obtained by reacting the 17,20-osmate ester of 3(a),17,20 - trihydroxy - 11 - keto - 20 - cyano - pregnane with an oxidizing agent; oxidation of the 17,20-osmate ester of 3,12,17,20-tetrahydroxy-20-cyano pregnane gives the 17,20-osmate ester of 3,12 - diketo 17,20 - dihydroxy - 20 - cyano - pregnane; oxidation of the 17,20-osmate ester of 3(a),17,20 - trihydroxy - 11 - keto - 20 - cyano - 21 - acetoxy - pregnane gives the 17,20 - osmate ester of 3,11 - diketo - 17,20 - dihydroxy - 20 - cyano - 21 - acetoxy - pregnane; and the like. The procedures indicated above are described in detail in my co-pending application Serial No. 76,205, filed February 12, 1949.

The following examples illustrate methods of carrying out the present invention but it is to be understood that these examples are given by way of illustration and not of limitation.

*Example 1*

196 mg. of $\Delta^{17}$ - 3,11 - diketo - 20 - cyano - pregnene (M. P. 222–230° C.) is dissolved in 2 cc. of benzene and 200 mg. of osmium tetroxide and 96 mg. of pyridine are added to this solution. The resulting solution is allowed to stand at room temperature for approximately 19 hours and then evaporated to dryness in vacuo to produce the 17,20 - osmate ester of 3,11 - diketo - 17,20 - dihydroxy-20-cyano-pregnane.

*Example 2*

1.0 g. of $\Delta^{17}$-3,11-diketo-20-cyano-21-acetoxy-pregnene (M. P. 189–190° C.) is dissolved in 10 cc. of benzene and the solution is treated with 1.0 g. of osmium tetroxide and 0.43 g. of pyridine. After standing at room temperature for 18 hours, the resulting solution is evaporated to dryness in vacuo to produce the 17,20-osmate ester of 3,11 - diketo - 17,20-dihydroxy-20-cyano-21-acetoxy-pregnane.

When $\Delta^{17}$ - 3,11-diketo-20-cyano-21-hydroxy-pregnene (M. P. 263–265° C.) is substituted for the 21-acetyl derivative in the foregoing procedure, the product obtained is the 17,20-osmate ester of 3,11 - diketo - 17,20,21-trihydroxy-20-cyano-pregnane.

*Example 3*

About 1.65 g. of $\Delta^{17}$-3(a)-acetoxy-11-keto-20-cyano-pregnene (M. P. 194–195° C.) is dissolved in 16 cc. of benzene and about 1.70 g. of osmium tetroxide and 0.75 cc. of pyridine are added to this solution. The resulting solution is allowed to stand at room temperature for approximately 20 hours and then evaporated to dryness in vacuo to produce the 17,20-osmate ester of 3(a)-acetoxy - 11 - keto - 17,20 - dihydroxy - 20 - cyano - pregnane.

*Example 4*

To a solution of 1.4 g. of $\Delta^{17}$-3(a),21-diacetoxy-11-keto-20-cyano-pregnene in 11 cc. of dry benzene is added 1.1 g. of osmium tetroxide and 0.50 cc. of pyridine. After standing at room temperature overnight, the reaction solution is evaporated to dryness under reduced pressure to produce the 17,20-osmate ester of 3(a),21-diacetoxy-11-keto-17,20-dihydroxy-20-cyano-pregnane.

*Example 5*

429 mg. of $\Delta^{17}$-3(a)-hydroxy-11-keto-20-cyano-21-acetoxy-pregnene is dissolved in 4 cc. of benzene and 600 mg. of osmium tetroxide and 0.30 cc. of pyridine is added to this benzene solution.

The resulting mixture is allowed to stand at room temperature for about 15 hours. The reaction solution is then evaporated to dryness in vacuo to produce the 17,20-osmate ester of 3(a),17,20-trihydroxy - 11 - keto - 20 - cyano - 21 - acetoxy-pregnane.

*Example 6*

The osmate ester, prepared as described in Example 5, is dissolved in 5 cc. of 90% acetic acid and this solution is treated with cooling with 1.05 cc. of acetic acid containing 3.52 milliequivalents of sulfuric acid. A solution containing 250 mg. of chromic acid in 4.4 cc. of 90% acetic acid is added to the solution of the osmate ester and the resulting solution is allowed to stand at room temperature for 30 minutes. 2 cc. of methanol is added to the reaction mixture and the resulting mixture is poured into a suspension of 5 gms. of potassium bicarbonate in 20 cc. of water. The resulting neutralized mixture is evaporated to dryness under reduced pressure, to produce the 17,20-osmate ester of 3,11-diketo-17,20 - dihydroxy-20-cyano-21-acetoxy-pregnane. This compound can also be prepared by treating $\Delta^{17}$-3,11 - diketo - 20-cyano-21-acetoxy-pregnene with osmium tetroxide as described in Example 2.

*Example 7*

1 g. of $\Delta^{17}$-3(a)-hydroxy-11-keto-20-cyano-pregnene is dissolved in 10 cc. of benzene and to this solution is added 1.0 g. of osmium tetroxide and 0.6 cc. of pyridine. The resulting mixture is allowed to stand at room temperature for about 15 hours. The reaction mixture is then evaporated to dryness under reduced pressure to produce the 17,20-osmate ester of 3(a)-hydroxy-11-keto-17,20-dihydroxy-20-cyano-pregnane.

*Example 8*

The osmate ester, prepared as described in Example 7, is dissolved in 10.5 cc. of acetic acid and 2.21 cc. of acetic acid containing 3.52 milliequivalents of sulfuric acid per cc. is added to this solution. The resulting solution is cooled to 15° C., 9.2 cc. of 90% acetic acid containing 420 mg. of chromic acid is added thereto, and the resulting mixture is allowed to stand for 1 hour. About 4 cc. of methanol is added to the reaction mixture and the mixture is poured into 40 cc. of water containing 31.5 g. of potassium bicarbonate. The aqueous mixture is evaporated to dryness under reduced pressure, and at a temperature of 30° C., to produce the 17,20-osmate ester of 3,11-diketo-17,20-dihydroxy-20-cyano-pregnane. This compound can also be prepared by treating $\Delta^{17}$-3,11-diketo-20-cyano-pregnene with osmium tetroxide as described in Example 1.

Various changes may be made in the carrying out the present invention without departing from the spirit and scope thereof. Insofar as these changes and modifications are within the purview of the annexed claims, they are to be considered as part of my invention.

I claim:

1. 17,20-osmate esters of 17,20-dihydroxy-pregnane compounds having a cyano radical attached to the C-20 carbon atom.

2. 17,20-osmate esters of 17,20-dihydroxy-pregnane compounds having a cyano radical attached to the C-20 carbon atom, and having at least one nuclear hydroxy substituent.

3. 17,20-osmate esters of 17,20-dihydroxy-pregnane compounds having a cyano radical attached to the C-20 carbon atom, and having at least one nuclear keto substituent.

4. The 17,20-osmate ester of 3,11-diketo-17,20-dihydroxy-20-cyano-pregnane.

5. The 17,20-osmate ester of 3,11-diketo-17,20-dihydroxy-20-cyano-21-acetoxy-pregnane.

6. The 17,20-osmate ester of 3(a), 21-diacetoxy-11-keto-17,20-dihydroxy - 20 - cyano - pregnane.

7. The 17,20-osmate ester of 3(a), 17,20-trihydroxy-11-keto-20-cyano - 21 - acetoxy - pregnane.

8. The 17,20-osmate ester of 3(a)-hydroxy-11-keto-17,20-dihydroxy-20-cyano-pregnane.

9. The process of preparing 17,20-osmate esters of 17,20-dihydroxy-pregnane compounds having a cyano radical attached to the C-20 carbon atom, which comprises reacting osmium tetroxide with a $\Delta^{17}$-20-cyano-pregnene compound.

10. The process of preparing 17,20-osmate esters of 17,20-dihydroxide-pregnane compound having a cyano radical attached to the C-20 carbon atom and having at least one nuclear hydroxy substituent, which comprises reacting osmium tetroxide with a nuclear hydroxylated $\Delta^{17}$-20-cyano-pregnene compound.

11. The process of preparing 17,20-osmate esters of 17,20-dihydroxy-pregnane compounds, having a cyano radical attached to the C-20 carbon atom and having at least one nuclear keto substituent, which comprises reacting osmium tetroxide with a nuclear keto-substituted $\Delta^{17}$-20-cyano-pregnene compound.

12. The process of preparing the 17,20-osmate ester of 3,11-diketo-17,20-dihydroxy-20-cyano-21-acetoxy-pregnane which comprises reacting osmium tetroxide with $\Delta^{17}$-3,11-diketo-20-cyano-21-acetoxy-pregnene, said reaction being carried out in the presence of pyridine.

13. The process of preparing the 17,20-osmate ester of 3(a),17,20-trihydroxy-11-keto-20-cyano-21-acetoxy-pregnane which comprises reacting osmium tetroxide with $\Delta^{17}$-3(a)-hydroxy-11-keto-20-cyano-21-acetoxy-pregnene, said reaction being carried out in the presence of pyridine.

14. The process of preparing the 17,20-osmate ester of 3(a),17,20-trihydroxy-20-cyano-21-acetoxy-pregnane which comprises reacting osmium tetroxide with $\Delta^{17}$-3(a)-hydroxy-20-cyano-21-acetoxy-pregnene, said reaction being carried out in the presence of pyridine.

LEWIS HASTINGS SARETT.

REFERENCES CITED

The following references are of record in the file of this patent:

UNITED STATES PATENTS

| Number | Name | Date |
| --- | --- | --- |
| 2,265,143 | Butenandt | Dec. 9, 1941 |